3,068,180
POLYMERIZATION OF DIOLEFINS WITH A Co OR Ni HALIDE-ALUMINUM ALKYL COMPOUND CATALYST

Gerrit J. van Amerongen, Amsterdam, Netherlands, and Kenzie Nozaki, El Cerrito, Calif., assignors to Shell Oil Company, a corporation of Delaware
No Drawing. Filed Feb. 10, 1960, Ser. No. 7,782
Claims priority, application Netherlands Feb. 27, 1959
8 Claims. (Cl. 252—429)

This invention relates to the polymerization of diolefins. More particularly it relates to an improved process for polymerizing conjugated diolefins.

It is known that conjugated dienes may be polymerized to produce polymers which contain a very high proportion of cis 1,4-addition product. Polymers having this composition can be cured to very useful rubbers which may be employed with advantage in many commercial applications including the manufacture of tires. These novel synthetic rubbers are akin to natural rubber and even superior thereto in some respects such as resilience, low temperature flexibility, set and abrasion resistance.

In recent work leading to the production of polydiolefins such as polybutadiene having a high cis 1,4-content it was found that such polymers can be produced by polymerizing, for example, butadiene-1,3 in a non-aqueous solution containing as essential catalytic ingredient a compound of cobalt or nickel. Certain systems of catalysts consisting of cobalt or nickel compounds complexed with acidic metal halides, e.g., aluminum halide and combined with a metal organic compound of the type of aluminum alkyl or aluminum alkyl halide, were developed for carrying out the conversion of diolefins to rubbery polymers of high cis 1,4-content. It was found that it was necessary to complex the cobalt or nickel halide or similar compound with the acidic metal halide in a hydrocarbon solvent such as benzene or cyclohexane. After a considerable aging period the complex resulted in a liquid portion which could be removed and used as the catalytic ingredient. Although very good results are obtained with such catalysts the preparation thereof generally requires the use of prolonged aging periods and may result in catalyst solutions having relatively unpredictable contents of cobalt or nickel and of aluminum. It is thus usually a time consuming procedure to prepare an active catalyst and the catalyst composition may be variable.

It is an object of this invention to provide an improved method for the polymerization of conjugated diolefins by means of catalysts which contain compounds of cobalt or nickel as their essential ingredients. It is another object of this invention to provide an improved method for adding an active cobalt or nickel-containing polymerization catalyst in the polymerization of a diolefin to a polymer of high cis 1,4-content. Other objects will become apparent from the following description of the invention.

These and other objects are accomplished by the process comprising polymerizing a conjugated diolefin at temperatures ranging from about −40° to about 150°C. and pressures below about 500 p.s.i. in the presence of hydrocarbon solvent and of a catalyst system consisting of one or more aluminum alkyl compounds and one or more halides of cobalt and/or nickel, the halides of cobalt and/or nickel being introduced into the system in the form of an alcoholic solution. For convenience, cobalt and nickel may be designated heavy metals, whereas aluminum is not a heavy metal.

The process of the invention may be applied to the polymerization of any conjugated diolefin hydrocarbon. It is particularly useful for the polymerization of butadiene-1,3 as this conjugated diolefin is found to polymerize according to the present invention with ease to produce a polymer having a very high portion of the cis 1,4 configuration. When the starting material is isoprene, the 1,4 polymerization is still usually predominant in this process although in this case considerable 1,4 polymerization may also occur. Other conjugated diolefins may be employed including, for example, 2,3-dimethyl butadiene-1,3; 2-ethyl butadiene-1,3; 4-methyl hexadiene-1,3; piperylene and the like. Not only may any conjugated diolefin be polymerized, but two or more conjugated dienes may be copolymerized to produce desired products. A representative copolymer of this type is, for example, a copolymer of butadiene and isoprene prepared according to the invention. Copolymerization with other ethylenically unsaturated compounds such as styrene may also be carried out according to this process.

An essential component of the catalysts used in the polymerization according to this invention are divalent halides of cobalt or nickel. In the order of preference, these include cobalt chloride, nickel chloride, cobalt bromide, and nickel bromide. The iodides and fluorides of cobalt and nickel are less preferred. The salts are utilized in the purified form free of water of crystallization.

Together with the cobalt or nickel halide there are used as co-catalysts aluminum alkyl compounds. These are preferably aluminum alkyl halides, more specifically aluminum monoalkyl dihalides, aluminum dialkyl monohalides and mixtures thereof, including the aluminum sesquialkyl sesquihalides. Mixtures of aluminum alkyl halides with aluminum trialkyls may also be employed.

Representative alkyl aluminum compounds include those represented by the formulas $AlR_3$, $AlR_2X$, $AlRX_2$, and $Al_2R_3X_3$. In these formulas R may be the same on different alkyl radicals of 1 to 10 carbon atoms such as methyl, ethyl, propyl, isopropyl, n-butyl, isobutyl, octyl, nonyl and the like. In the preferred embodiment the R's are lower alkyls having from one to four carbon atoms, with ethyl being particularly preferred. The preferred halogen (X) occurring in the aluminum alkyl halides is chlorine. Bromine is less preferred.

The polymerization of diolefins according to this invention is carried out in solution with a suitable non-aqueous diluent or solvent. The solvent preferably consists substantially of saturated aliphatic, cycloaliphatic and/or aromatic hydrocarbons. Aliphatic olefins may also be used in some cases, e.g., in the polymerization of butadiene the solvent may consist mainly of normal butenes. The nature of the reaction medium may have a substantial effect on the polymerization reaction, particularly on the rate thereof. For example, when using the present catalyst systems, butadiene polymerizes much more rapidly in a medium containing a substantial amount of aromatic hydrocarbons and isoprene in a medium containing a substantial amount of aliphatic hydrocarbons. The reaction medium may also affect the nature of the product. Preferred solvents for the production of polybutadiene are aromatic hydrocarbons, particularly benzene and/or toluene. Cyclohexane is also suitable in such polymerization. For the production of polyisoprene, preferred solvents are aliphatic hydrocarbons such as hexane, isooctane (2,2,4-trimethylpentane) and the like.

In the preferred method of catalyst preparation according to this invention the catalyst is produced in a hydrocarbon medium consisting of the same solvents which are used in the polymerization reaction itself. The catalyst solution is suitably prepared by adding to the hydrocarbon solvent a desired amount of aluminum alkyl or aluminum alkyl halide or mixture thereof and then adding thereto a solution of cobalt and/or nickel halide in alcohol.

Suitable alcohols are those having from 1 to 4 carbon atoms; methanol, ethanol and isopropanol are particularly useful. Saturated alcoholic solutions of $CoCl_2$ in $C_1$ to $C_4$ alcohols contain between about 43 and 53 gm. $CoCl_2$ per 100 grams alcohol at 25° C. The solubility of $CoCl_2$ in anhydrous methanol, ethanol, and n-butanol at 25° C. is, respectively, 43.6, ca. 51.5 and 45.8 gm. per 100 gm. alcohol. The solubility of $CoBr_2$ in methanol and ethanol at 25° C. is, respectively, ca. 51 and ca. 81 gm. per 100 gm. alcohol. Solubilities increase substantially with temperature, being, for example at 60° C.: 66.8 gm. $CoCl_2$/100 gm. ethanol, 153.1 gm. $CoBr_2$ in 100 gm. methanol and 120.8 gm. $CoBr_2$ in 100 gm. ethanol. Nickelous chloride and bromide are similarly soluble in lower alcohols.

The alcoholic solutions of cobalt and/or nickel halides used in this invention are preferably relatively concentrated. It is undesirable to introduce excessively large amounts of alcohol into the reaction system, and this is avoided by the use of saturated or nearly saturated solutions. The heavy metal salt is preferably introduced in form of an alcoholic solution containing at least about 10 grams per 100 grams alcohol, and preferably containing from 50% to 100% of the saturating amount for the particular solvent and temperature. The solution is suitably prepared at room temperature, but may be prepared at an elevated temperature which is not higher than that employed in the polymerization reaction.

To illustrate the relative proportions, a reaction is carried out in a hydrocarbon solvent with an initial aluminum ethyl dichloride concentration of 10 milliatoms Al per liter and an Al to Co atomic ratio of 1000:1. To a reactor containing 100 l. of hydrocarbon solvent at 30° C. is added 127 grams (1000 millimoles=1 mole) aluminum ethyl dichloride. The catalyst is to be $CoCl_2$ in methanol. Preferably, a saturated $CoCl_2$ solution (43.6 g./100 g. methanol=30.4 g./100 g. solution=.234 mole/ 100 g. solution) is prepared at room temperature. Enough solution is to be added to provide 1 milliatom of cobalt (0.130 g. $CoCl_2$). The required amount is found to be 0.428 g. of the saturated solution. This contains 0.130 g. $CoCl_2$ (1 millimole) and 0.298 g. methanol (9 millimoles). The catalytic solution is completed by adding 0.428 g. of methanolic $CoCl_2$ solution saturated at 25° C. to the reaction vessel. Polymerization is then carried out by gradual addition of butadiene, e.g., about 10 l. (liquid) over a period of one to two hours, while the temperature is maintained at 30° C. Polybutadiene is then recovered in the conventional manner. If it is considered undesirable to attempt to add the small amount of $CoCl_2$ solution (0.428 g.) directly to the 100 l. reaction vessel, the $CoCl_2$-methanol solution may be dissolved in, say, 10 cc. to 1 liter of hydrocarbon solvent and this solution added to the reaction vessel. It would be undesirable to increase the bulk of the cobalt chloride solution by adding substantially more alcohol, i.e., by preparing a substantially more dilute alcoholic solution, because excess alcohol may interfere with the action of the aluminum alkyl compound in the catalyst.

The process according to this invention affords many possibilities of control. Variable conditions are the choice of the various components of the catalyst system, the concentrations of these components, the ratios of these concentrations, the choice of solvent medium and the ratio of aliphatic aromatic hydrocarbons therein, the order in which the catalyst components are combined, the period during which the catalyst components are combined before polymerization and the temperature during this period, the temperature and pressure during polymerization and the concentration of monomer in the polymerization reaction mixture. Accordingly, this process is readily adaptable even when the nature of the product and the polymerization rate have to conform to strict and varied requirements.

The suitability of various hydrocarbon diluents has already been discussed. In the polymerization of butadiene in the presence of an aromatic hydrocarbon, the benzene or other aromatic hydrocarbon present should be the sole solvent, or, if aromatic is used with an aliphatic diluent the amount of aromatic should be sufficient to permit the resulting polybutadiene to remain in solution in the liquid reaction mixture. This is readily determined in each instance and varies with the amount of butadiene charged, the temperature and the individual aliphatic solvent. For example, with butene as the solvent, 8 to 10% benzene is generally sufficient. Saturated $C_4$ diluents may require admixture of 25 to 35% benzene.

The concentration of diolefin in the reaction mixture is suitably up to about 25% by weight or more. Variations within this range may affect the molecular weight of the polymer. At relatively low concentrations of diolefin the viscosity of the polymer solution and the molecular weight of the polymer will be relatively lower.

The total concentration of cobalt and/or nickel compounds in the reaction mixture is generally lower than that corresponding to one milliatom of cobalt and/or nickel per liter and preferably lower than that corresponding to 0.1 milliatom of cobalt and/or nickel per liter. If introduced according to the invention into the system, the halides of cobalt and/or nickel have a very favorable effect even at a very low concentration. It may be necessary to choose limited concentrations in order to prevent excessive polymerization rates which will lead to excessive generation of heat. The use of these compounds in small amounts is, of course, also attractive from the economy standpoint. Not only does the reduced consumption of chemicals lower the cost price, but simplification of the procedure may also result in economies. Whereas in related processes the removal of catalysts remnants from the polymers is usually a very cumbersome procedure, this may often be entirely omitted in the present case; the concentrations of cobalt and nickel in the products obtained according to the invention are frequently so low that they have very little detrimental effect.

The total concentration of aluminum alkyl compounds in the reaction mixture generally corresponds to 1 to 20 milliatoms of aluminum per liter.

The ratio of the number of atoms of aluminum to the number of atoms of cobalt and/or nickel in the active catalyst is preferably greater than 10:1. A value of this ratio between 100:1 and 100,000:1 is especially preferred.

The ratio of aluminum-bound halogen atoms to alkyl groups in the catalyst greatly affects the rate of the polymerization reaction and the average molecular weight of the polymer.

Comparative experiments have been carried out in which aluminum monoethyl dichloride and aluminum diethyl monochloride were used as aluminum alkyl compounds and the ratio in which these compounds were present was varied, the sum of their concentrations (in moles) being the same in all experiments. With the use of mixtures of aluminum monoethyl dichloride and aluminum diethyl monochloride the polymerization rate was often higher than when these compounds were used separately. These phenomena were, however, also governed by various other factors such as the choice of monomer.

The intrinsic viscosity (I.V.) of the polymer is a function of the molecular weight. The trend of the I.V. of the product as a function of the ratio of aluminum ethyl dichloride to aluminum diethyl monochloride was examined in these experiments. In the case of butadiene, the I.V. was generally found to be high when this ratio was high and low when this ratio was low. In the case of isoprene, I.V. maximum were frequently found at intermediate ratios.

In the polymerization of isoprene a low I.V. may be due to cyclization, which is in many cases an undesirable phenomenon. Within the scope of the invention this cyclization may be effectively counteracted by the addition of a greater amount of aluminum diethyl monochloride, by increasing the temperature (60° C. gives better results than 20° C.) and/or by using an aliphatic medium such as isooctane; the percentage of polyisoprene having a 3,4-structure may be reduced by increasing the ratio of aluminum monoethyl dichloride to aluminum diethyl monochloride.

these differed in the various experiments (concentrations of the catalyst components, polymerization temperature, duration of polymerization), the polymerization rate (in grams of polymer per liter and per hour, based on the product weight found) and for two products the percentages of cis- trans- and 1.2 polybutadiene (found by infrared analysis).

| Concentrations, mmol./liter | | Temp, °C. | Duration, min. | Polymerization rate, g./l./h. | Cis, percent | Trans, percent | 1.2, percent |
|---|---|---|---|---|---|---|---|
| CoCl$_2$ | AlC$_2$H$_5$Cl$_2$ | | | | | | |
| 0.95 | 10 | 20 | 30 | 19 | 92 | 5 | 3 |
| 0.095 | 10 | 20 | 20 | 450 | | | |
| 0.01 | 5 | 20 | 30 | 12 | | | |
| 0.01 | 10 | 20 | 30 | 16 | | | |
| 0.01 | 20 | 20 | 30 | 55 | | | |
| 0.01 | 40 | 20 | 30 | 185 | | | |
| 0.001 | 20 | 20 | 30 | 4 | | | |
| 0.95 | 10 | 60 | 25 | 340 | 93 | 4 | 3 |
| 0.05 | 10 | 60 | 15 | 220 | | | |
| 0.01 | 10 | 60 | 30 | 17 | | | |

The temperature at which the reaction is carried out will depend upon the catalyst and the solvent utilized and to some extent upon the result desired. Temperatures generally range from about −20° C. to about 100° C. Temperatures between 10° and 70° C. are particularly preferred, although higher and lower temperatures may also be used.

The process is conducted in an inert atmosphere. This is preferably accomplished by first sweeping out the reaction zone with an inert gas. Suitable inert materials include nitrogen, methane and the like.

The most convenient operating pressure is that which is generated by the system. This will vary depending upon the specific nature of the conjugated diene, the solvent and the respective amounts. Such pressures are termed "autogenic" pressures. If desired, higher or lower pressures may be employed, e.g., in the range from 1 to 5 atmospheres absolute.

Both the preparation of the catalyst and the polymerization of conjugated dienes according to the invention may be performed batchwise or continuously. If desired, the later operation is carried out in reaction mixtures of constant composition which are kept homogeneous.

The invention is further illustrated by the following examples. It is to be understood that examples are for the purpose of illustration and the invention is not to be regarded as limited by any of the specific conditions recited therein.

*Example I*

POLYMERIZATION OF BUTADIENE WITH THE CoCl$_2$—Al$_2$C$_2$H$_5$Cl$_2$ CATALYST SYSTEM

Comparative experiments were carried out in stirred 300-ml. flasks from which the air had been expelled by dry oxygen-free nitrogen. 150 ml. of benzene were introduced into each of these flasks and subsequently also 1.5 or 3 mmol. of aluminum monoethyldichloride (10 or 20 mmol. per liter) and a varied amount of a solution of cobalt chloride in absolute ethanol saturated at 20° C. In some experiments the temperature was increased to 60° C. and in others kept at 20° C. Butadiene was then passed through the mixtures with stirring. Polymerization set in almost immediately. During polymerization the temperature was kept constant at the above-mentioned values, and each mixture remained substantially saturated with butadiene. After a certain time the polymerization was discontinued and the polymer coagulated by adding isopropanol. The coagulate was separated off, washed with fresh isopropanol, dried in vacuo at 60° C. and weighed.

The following table shows the conditions, insofar as

*Example II*

POLYMERIZATION OF BUTADIENE WITH THE NiCl$_2$—AlC$_2$H$_5$Cl$_2$ CATALYST SYSTEM 1.5 mol of AlC$_2$H$_5$Cl (10 mmol. per liter) and 0.014 mol. of nickel chloride (0.095 mmol. per liter), the latter compound in the form of a solution in absolute ethanol saturated at 20° C., were added under an atmosphere of oxygen-free nitrogen to 150 ml. of benzene at 20° C. Butadiene was passed through the mixture for 10 minutes with continuous stirring. The polymer formed was then coagulated by adding isopropanol and the coagulate further treated as in Example I.

A second experiment was carried out at 60° C., the introduction of butadiene lasting 30 minutes. The conditions were otherwise the same as in the experiment described in the previous paragraph.

The following table shows the polymerization rates in both experiments in grams per liter and per hour based on the yields found; it also shows an intrinsic viscosity (I.V.) which was determined by measuring it in a solution of the product in benzene at 25° C.

| Temp., °C. | Duration, min. | Polymerization rate, g./l./h. | I.V. |
|---|---|---|---|
| 20 | 10 | 200 | 0.45 |
| 60 | 30 | 19 | <0.1 |

*Example III*

POLYMERIZATION OF BUTADIENE WITH THE AlC$_2$H$_5$Cl$_2$—Al(C$_2$H$_5$)$_2$Cl—CoCl$_2$ CATALYST SYSTEM

Experiments as described in Example I were made in which, however, AlC$_2$H$_5$Cl$_2$ was wholly or partly replaced by Al(C$_2$H$_5$)$_2$Cl. The concentration of these two compounds together was always 10 mmol. per liter. In addition, 0.095 mmol. of CoCl$_2$ per liter was invariaby used. The temperature was invariably 20° C. In addition to the rate at which the polymer was formed, the I.V. and the plasticity according to Hoekstra was determined.

| Concentration mmol/liter | | Duration, min. | Polymerization rate, g./l./h. | I.V. | Plasticity |
|---|---|---|---|---|---|
| AlC$_2$H$_5$Cl$_2$ | Al(C$_2$H$_5$)$_2$Cl | | | | |
| 0 | 10 | 30 | 12 | Low | Low |
| 2.5 | 7.5 | 30 | 180 | 1.6 | 17 |
| 4 | 6 | 15 | 510 | 2.6 | 43 |
| 7 | 3 | 10 | 800 | 3.6 | 92 |
| 7.5 | 2.5 | 10 | 1,200 | ---- | 100 |
| 10 | 0 | 20 | 450 | ---- | 100 |

Example IV

POLYMERIZATION OF ISOPRENE WITH CoCl₂ AND VARIOUS ALUMINUM ALKYLS

Solutions of 10% by weight of isoprene in benzene were prepared at 60° C. in an atmosphere of oxygen-free nitrogen. To these solutions were added aluminum monoethyl dichloride and/or aluminium dialkyl monochloride, invariably at a joint concentration of 10 mmol. per liter. Subsequently was added a solution of cobalt chloride in absolute ethanol saturated at 20° C. in such an amount that the concentration of cobalt chloride in the mixtures was 0.095 mmol. per liter. The copolymerization was continued at 60° C. for one hour.

A similar experiment was carried out at 20° C. for two hours.

After the specified polymerization time had elapsed, the polymer was coagulated in all experiments by adding isopropanol. The coagulate was further treated as in Example I and finally weighed. The conversion was calculated from the weight found. The I.V. was also determined by measuring it in solutions of the polymers in benzene at 25° C.

| Concentration mmol. per liter | | Temp., °C. | Duration, hours | Conversion, percent | I.V. | Nature of Product |
|---|---|---|---|---|---|---|
| AlC₂H₅Cl₂ | Al(C₂H₅)₂Cl | | | | | |
| 10 | 0 | 60 | 1 | 39 | 0.19 | Resin (cyclized). |
| 8 | 2 | 60 | 1 | 26 | 0.17 | |
| 6 | 4 | 60 | 1 | 52 | 1.2 | |
| 4 | 6 | 60 | 1 | 56 | 2.5 | |
| 2 | 8 | 60 | 1 | 32 | 2.5 | Rubbery. |
| 0 | 10 | 60 | 1 | 12 | 2.1 | |
| 6 | 4 | 20 | 2 | 12 | 0.9 | |

We claim as our invention:

1. A method of preparing a catalytically active liquid reaction mixture which comprises mixing (1) a substantially anhydrous liquid hydrocarbon, (2) at least one aluminum alkyl halide, having from 1 to 10 carbon atoms per alkyl group, and (3) a concentrated anhydrous solution containing at least 50% of the saturating amount of a divalent halide of a heavy metal selected from the group consisting of cobalt and nickel in an alcohol having from 1 to 4 carbon atoms per molecule, in a ratio to provide at least 10 atoms of aluminum per atom of heavy metal in said reaction mixture.

2. A method according to claim 1 wherein the halides are chlorides.

3. A method according to claim 1 wherein said alcohol is ethanol.

4. A method according to claim 1 wherein the ratio of the number of aluminum atoms to the number of heavy metal atoms in the reaction mixture is in the range from 100:1 to 100,000:1.

5. A method of preparing a catalytically active liquid reaction mixture which comprises mixing (1) a substantially anhydrous liquid hydrocarbon, (2) at least one aluminum alkyl chloride having from 1 to 10 carbon atoms per alkyl group, and (3) a concentrated anhydrous solution containing at least 50% of the saturating amount of cobaltous chloride in an alcohol having from 1 to 4 carbon atoms per molecule, in a ratio to provide at least 10 atoms of aluminum per atom of cobalt.

6. A method according to claim 5 in which said aluminum alkyl chloride is an aluminum ethyl chloride.

7. A method according to claim 5 wherein said aluminum alkyl chloride is present in a concentration corresponding to 1 to 20 milliatoms of aluminum per liter.

8. A method according to claim 5 wherein the ratio of the number of aluminum atoms to the number of cobalt atoms in the reaction mixture is in the range from 100:1 to 100,000:1.

References Cited in the file of this patent

UNITED STATES PATENTS

| 2,953,556 | Wolfe | Sept. 20, 1960 |
| 2,977,349 | Brockway | Mar. 28, 1961 |

FOREIGN PATENTS

| 538,782 | Belgium | Dec. 6, 1955 |
| 543,292 | Belgium | June 2, 1956 |
| 789,781 | Great Britain | Jan. 29, 1958 |
| 1,171,450 | France | Oct. 6, 1958 |
| 1,175,201 | France | Nov. 10, 1958 |
| 851,112 | Great Britain | Oct. 12, 1960 |